United States Patent [19]

Herman

[11] 4,280,236
[45] Jul. 28, 1981

[54] SELF-UNCAPPING HONEYCOMB AND EXTRACTOR MEANS FOR USE THEREWITH

[76] Inventor: Luther R. Herman, 306 Brooks Ave., Raleigh, N.C. 27607

[21] Appl. No.: 46,952

[22] Filed: Jun. 8, 1979

[51] Int. Cl.³ .................... A01K 47/02; A01K 59/02
[52] U.S. Cl. ........................................ 6/2 R; 6/11; 6/12 F
[58] Field of Search ............... 6/11, 12 F, 2 R, 12 A, 6/10, 2 A

[56] References Cited

U.S. PATENT DOCUMENTS

| | | | |
|---|---|---|---|
| 2,239,708 | 4/1941 | France | 6/11 |
| 2,631,307 | 3/1953 | Sugano | 6/2 R |
| 2,673,358 | 3/1954 | Silva | 6/12 F |
| 3,683,432 | 8/1972 | Musgrove | 6/2 R |
| 4,021,639 | 5/1977 | Espino | 6/12 F X |
| 4,141,098 | 2/1979 | Culhane et al. | 6/2 R |

FOREIGN PATENT DOCUMENTS

| | | | |
|---|---|---|---|
| 518384 | 11/1955 | Canada | 6/2 R |
| 829376 | 1/1952 | Fed. Rep. of Germany | 6/11 |
| 241791 | 10/1925 | United Kingdom | 6/12 F |

Primary Examiner—Hugh R. Chamblee
Attorney, Agent, or Firm—Mills & Coats

[57] ABSTRACT

This invention is an improved method of removing the sealing wax of a honeycomb in preparation for removal of the honey contained therein. The process includes the providing of heating elements about the entrance of the chambers of the comb which, when electrical current is passed therethrough, will cause the beeswax sealing the chambers to soften. Also an improved centrifugal extractor is provided to further assist in honey removal.

10 Claims, 11 Drawing Figures

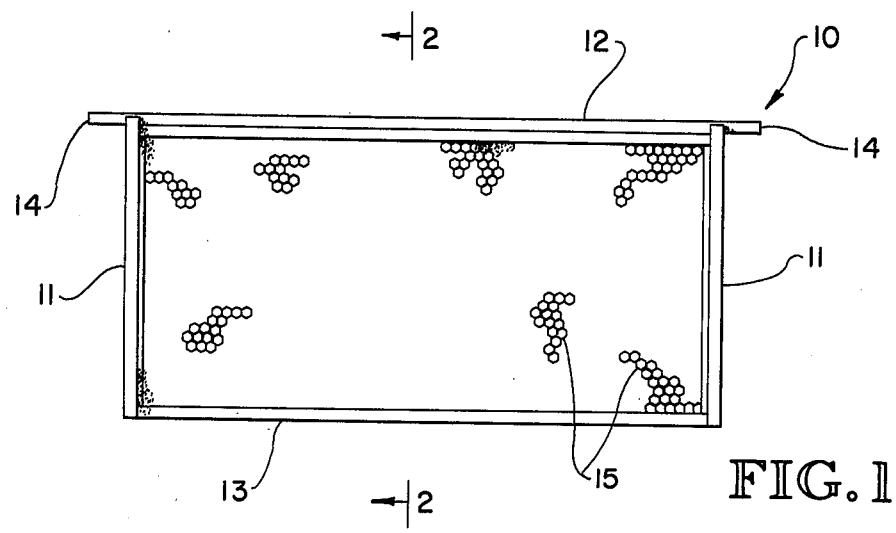
FIG. 1
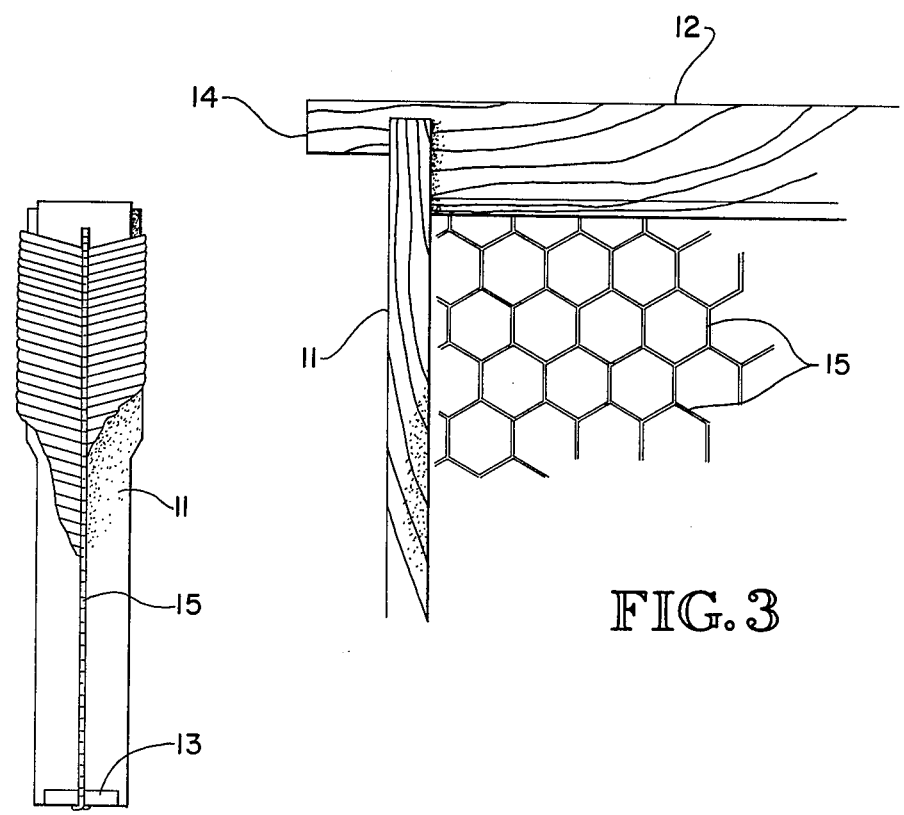
FIG. 2
FIG. 3

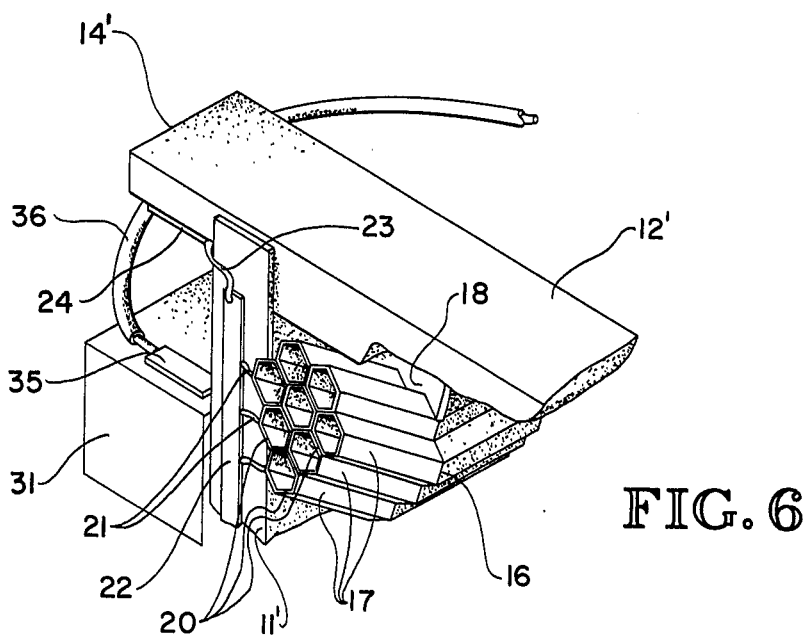
FIG. 6
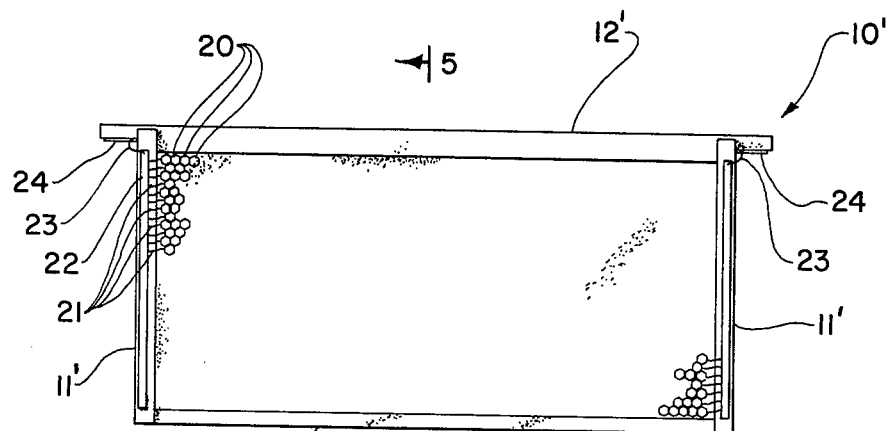
FIG. 4
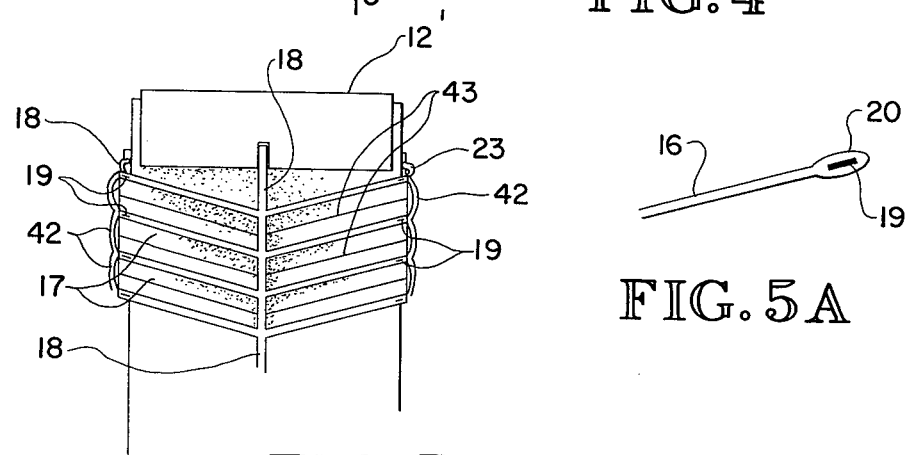
FIG. 5
FIG. 5A

SELF-UNCAPPING HONEYCOMB AND EXTRACTOR MEANS FOR USE THEREWITH

FIELD OF INVENTION

This invention relates to apiculture and more particularly to removal of honey from honeycombs.

BACKGROUND OF INVENTION

Since man first began uncapping honeycombs to remove the honey contained therein, the usual method has been to cut the caps off, often assisted by use of a heated knife. This is a messy job at best and since a part of the comb remains connected to the beeswax caps, further processing is required for the beeswax as a useable item.

With the advent of commercial beekeeping, removable frames have been provided in specially constructed hive containers first to aid the bees in building the combs and secondly to allow easy removal of the comb at the appropriate time. Even with this relatively sophisticated method, each frame must be individually handled to remove the honey from the filled honeycomb.

Rotating knifes or blades have been used in an effort to speed up the uncapping process but have met with only limited success at best. Artificial honeycombs have been fabricated and several types of plastic materials have been found suitable for this purpose and acceptable to the bees. Uncapping of plastic honeycombs, however, is difficult with piercing rather than cutting usually being required which reduces the honey extraction rate which is an additional disadvantage.

In all of these prior known systems, uncapping and extraction of the honey were accomplished in two separate operations with intermediate handling being required therebetween.

SUMMARY OF INVENTION

After much research and study into the above-mentioned problems, the present invention has been developed to permit full uncapping and extraction of the honey from the comb in the same machine. All cutting, piercing and similar methods of uncapping have been eliminated. The application of heat through a novel electrical system during centrifugal spinning uncaps the comb cells and removes the honey therefrom in a single continuous process thus eliminating all intermediate handling.

In view of the above, it is an object of the present invention to provide an open mesh honeycomb foundation.

Another object of the present invention is to provide an open mesh honeycomb foundation which is coated with beeswax to entice building of the comb thereon.

Another object of the present invention is to provide an open mesh honeycomb foundation of an electrically conductive material whereby said foundation can act as a heating element to open the comb for removal of the honey therein.

Another object of the present invention is to provide a means for removing beeswax caps from honeycombs filled with honey by application of heat to the beeswax.

A further object of the present invention is to provide an electric heating element in a honeycomb for melt removal of beeswax caps.

Another object of the present invention is to provide, in combination with heating elements for removing beeswax caps from honeycomb cells, an extracting means for honey removal therefrom through the use of centrifugal force.

Another object of the present invention is to provide, in a device for processing honeycombs, a single machine which combines uncapping and extracting functions.

Another object of the present invention is to provide a means for uncapping filled frames of honeycomb in supers by heating the cell edges.

Another object of the present invention is to provide a means for embedding electrical conductors within the edges of honeycomb cell walls to increase the temperature thereof by application of electric current.

Another object of the present invention is to provide a honeycomb formed from an electrical insulating material and including a plurality of electric heater means in the cell wall edges thereof.

Another object of the present invention is to provide a centrifugal extracting device having special electrical contacts therein to allow specially designed honeycombs with electrically operated uncapping heaters to be used therewith.

Other objects and advantages of the present invention will become apparent and obvious from a study of the following description and the accompanying drawings which are merely illustrative of such invention.

BRIEF DESCRIPTION OF DRAWINGS

FIG. 1 is a side elevational view of a honeycomb frame with a bee made comb thereon;

FIG. 2 is a sectional view taken through lines 2—2 of FIG. 1;

FIG. 3 is an enlarged fragmentary view showing the details of the upper corner of a frame disclosed in FIG. 1;

FIG. 4 is a side elevational view of a honeycomb frame incorporating the uncapping means of the present invention;

FIG. 5 is a sectional view taken through lines 5—5 of FIG. 4;

FIG. 5A is an enlarged fragmentary view of the comb wall showing the heating element embedded therein;

FIG. 6 is an enlarged fragmentary perspective view showing details of the uncapping means of the present invention;

DETAILED DESCRIPTION OF INVENTION

Figure 7:
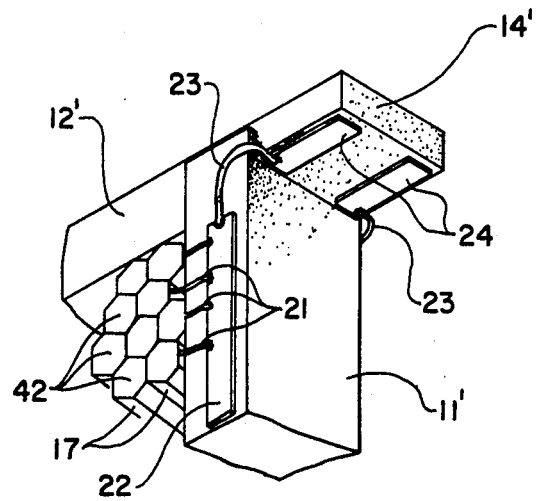
FIG. 7 is an enlarged fragmentary perspective view of the uncapping frame showing details of the electrical contacts.

With further reference to the drawings, an improved honeycomb frame 10 is disclosed including end members 11, a top member 12 and a bottom member 13. On either end of top member 12 are outwardly projecting flanges 14 for supporting the frame within the hive enclosure. An open mesh honeycomb foundation 15 is disposed between and secured to the top, bottom, and ends of frame 10 in the same manner as the hexagonally patterned foundation sheets of the prior art. If desired, the open mesh foundation 15 can be coated with beeswax to entice the bees to build their comb thereon.

Since wire mesh fabric with hexagonal openings therein is inexpensive to produce and yet is extremely rigid as a comb foundation, there are distinct advantages in using this rather than imprinted aluminum or plastic sheets that have heretofore been used.

The open mesh honeycomb 15 can, of course, be made from either expanded metal, wire netting, expanded plastic or similar structurally strong mesh material. The mesh sizes are between 0.20 and 0.25 inch. It has been noted, however, that larger as well as irregular mesh sizes can be used as long as the size approximates that of normal honeycomb cells since the bees will make adjustments in standarizing the comb.

The honeycomb frame 10' of FIG. 4 is basically the same as frame 10 of FIG. 1 including end members 11', top bar 12' and bottom member 13. Also flanges 14' are provided for use in conjunction with the bee hive (not shown).

An artificial honeycomb 16 in the form of a double array of individual cells 17 is formed from plastic or other suitable electrically nonconductive material. This material is heat resistant within the parameters of the operating temperature of the uncapping heaters hereinafter described 18. The central vertical plane 18 of the artificial honeycomb forms the closed ends of the individual cells 17 and acts as a foundation similar to the open mesh foundation 15 hereinafter described.

A heater grid of expanded metal, wires or other similar resistance type electrical conductors 19 are formed in the lip portion 20 of the open end of each of the cells 17 as seen particularly clearly in FIGS. 5 and 5A. This grid work of electrical conductors effectively forms resistance type heating means about the open periphery of each of the individual cells 17.

A plurality of wires 21 operatively connect the grid work of electrical conductors 19 with end connectors 22. As can clearly be seen in FIGS. 4 and 5, these end connectors are secured to both sides of each of the end members 11' of frame 10'.

A lead connector 23 operatively connects each of the end connectors 22 with a contact plate 24 on the underside of each of the flanges 14'. It should be noted that the heater systems are interconnected from one end to the other end of frame 10' but the heating system on one side of the frame is completely independent of the heating system on the other side. The reason for this will become apparent from the following description of the centrifugal extractor shown in FIG. 8.

The extractor with which the honeycomb of the present invention can be used can either be manually operated or motor driven. The embodiment of FIG. 8 discloses a motor driven version which includes a generally cylindrical shaped container 25 with a removable top or lid portion 26 engaged therewith.

Bearings 27 and 28 are provided, the former through lid 26 and the latter on the bottom portion 29 of container housing 25. Shaft 30 is rotatively mounted through bearing 27 and in bearing 28.

An upper plate 31 and lower plate 32 are fixedly secured to shaft 30. Extending between and secured to these upper and lower plates are end panels 33. Retainer posts 34 are also secured to and extends between the upper and lower plates in spaced relation to each of the end panels 33. Thus it can be seen that a slot is effectively provided into which the honeycomb frame 10' can be slidingly dropped.

An extractor contact plate 35 is provided on upper plate 31 and is adapted to make electrical contact with the outermost plate 25 of frame 10'. A connector wire 36 leads back to standard rotary contact 37 which is electrically connected to switch 38 which in turn is connected to line cord 39.

A motor of standard configuration is contained within motor housing 40 and is also controlled by switch 38. This motor is drivingly connected to shaft 30.

From the above it can be seen that when line cord plug 41 is connected to a suitable power source (not shown), switch 38 can be turned on thus closing the circuit through contacts 24 and 35, electrical conductors 19, and back out contact plates at the other end of the frame 10' to cause resistance heating and thus melting of the beeswax caps 42 of each of the individual cells 17. At the same time the motor within housing 40 will rotate shaft 30. This coordinated heating and spinning causes the caps 42 to be meltingly removed from the end of the cells and the honey 42 contained therein to be removed therefrom by centrifugal force.

Once all of the honey has been removed from one side of the honeycomb 16, the comb frame 10' is simply lifted from the extractor frame, indicated generally at 44, and turned around for removal of the honey from the other side in the same manner as hereinabove described for the first side.

Once the artificial honeycomb has been emptied, it is removed, from the extractor, cleaned up and replaced in the hive for refilling by the bees therein.

Figure 9:
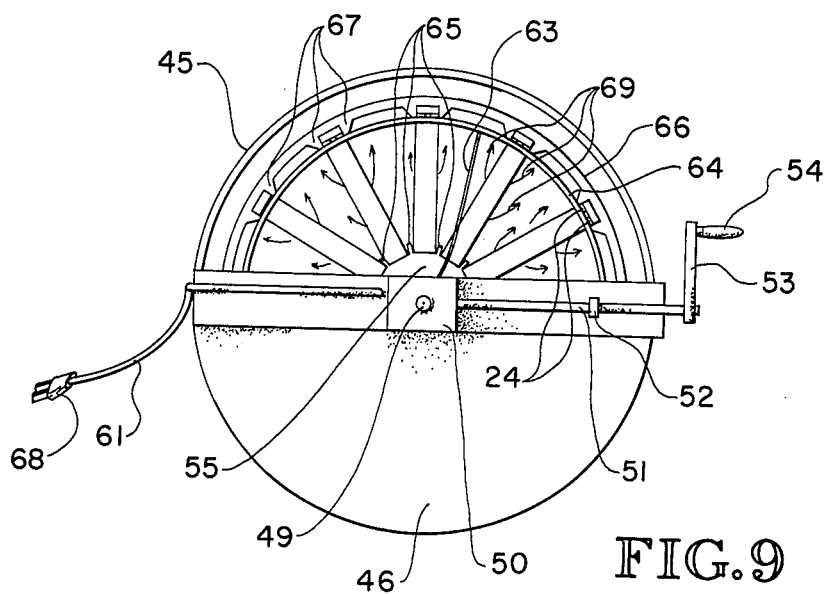
FIG. 9 is a partially cutaway top plan view of a modified centrifugal extraction device.
Figure 10:
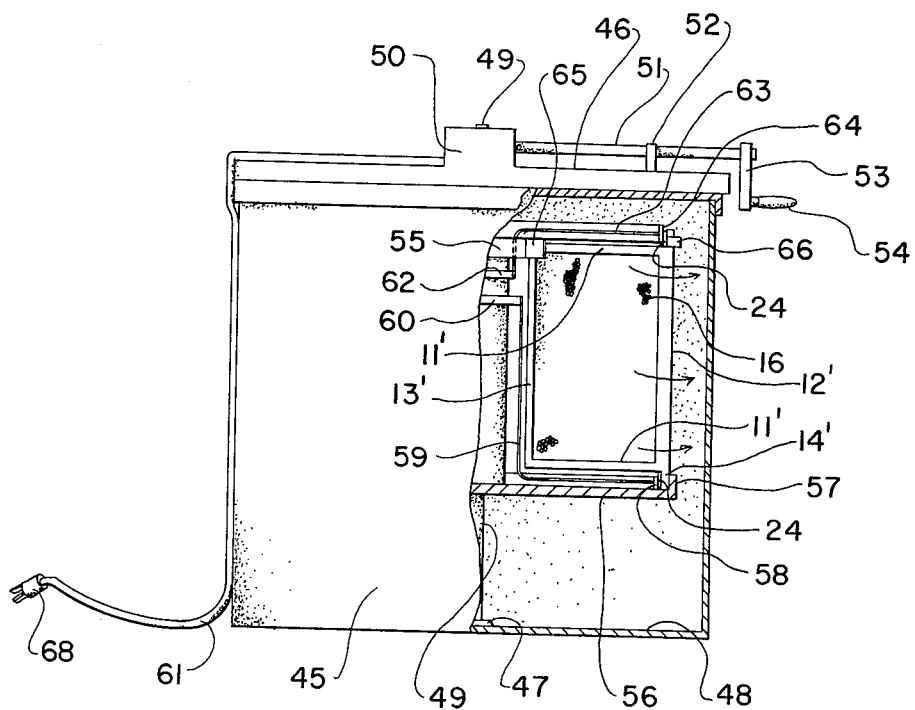
FIG. 10 is a partially cutaway side elevational view of the modified device of FIG. 9.

A modified centrifugal extractor is shown in FIGS. 9 and 10 and includes a container like housing 45 and a nestling top or lid 46. A bearing 47 is provided in bottom 48 of container 45 and is adapted to rotatively receive shaft 49. The upper portion of this shaft is rotatively supported by gear housing 50. A drive shaft 51 is rotatively mounted through bracket 52 and has mounted on one end thereof a crank 53 which carries a handle 54. The other end of shaft 51 operatively engages standard gearing operatively located within gear housing 50. This gear drive between drive shaft 51 and extractor shaft 49 can be of the ice cream freezer type, is well known to those skilled in the art, and further discussion of the same is not deemed necessary.

Upper and lower comb frame support plates 55 and 56 are generally circular in configuration and are fixedly secured to the shaft 49. About the periphery of lower plate 56 is a circular comb frame engaging lip 57. Spaced interiorly from this lip is a contact plate 58 which can be in the form of a ring of electrically conductive material. A connector wire 59 leads from contact plate 58 to contact ring 60. This ring in turn is connected to one of the wires within line cord 61. A second contact ring 62 is provided which is operatively connected to the second wire in standard line cord 61. Connector wire 63 is in sliding rotative contact with ring 62 at one end and is fixedly connected to upper contact plate 64 at its other end. This upper contact plate is preferably in the form of a removable ring.

A plurality of outwardly radiating retaining flanges 65 are provided on upper support plate 55.

To load the modified extractor of FIGS. 9 and 10 with honeycomb frames, the top or lid 46 is removed from housing 45 and the honeycomb frames 10' are slipped in on their sides with the top bar 12 being disposed in a vertical position. Flanges 14 engage lip 57 of lower support plate 56 with the contact plates 24 thereof being in electrical contact with plate 58.

The bottom member 13 of each of the honeycomb frames 10' fits between the radiating flanges 65 of upper support plate 55 and are supported thereby. The upper contact ring 62 is then slipped into place in electrical contact with contact plates 24.

A retaining ring 66 having top bar engaging shoulders 67 provided thereon is slipped over the radiating honeycomb frames 10' as can clearly be seen in FIGS. 9 and 10. The lid 46 is then replaced on housing 45 and the modified extractor is ready for operation.

The plug 68 of line cord 61 can be plugged into any suitable power source (not shown) and through said line cord, the two contact rings, and the associated frame contact plates, the electrical conductors 19 of the artificial honeycomb 16 will begin to heat through electrical resistance. Crank 53 can then be turned by handle 54 which rotates drive shaft 51 to rotate extractor shaft 49. Thus as the capping beeswax on the individual honeycomb cells 17 melts, such cells become uncapped and through the spinning of shaft 49, the honey 43 within the cells will be slung out by centrifugal force as indicated by the arrows 69 in FIGS. 9 and 10.

Figure 8:
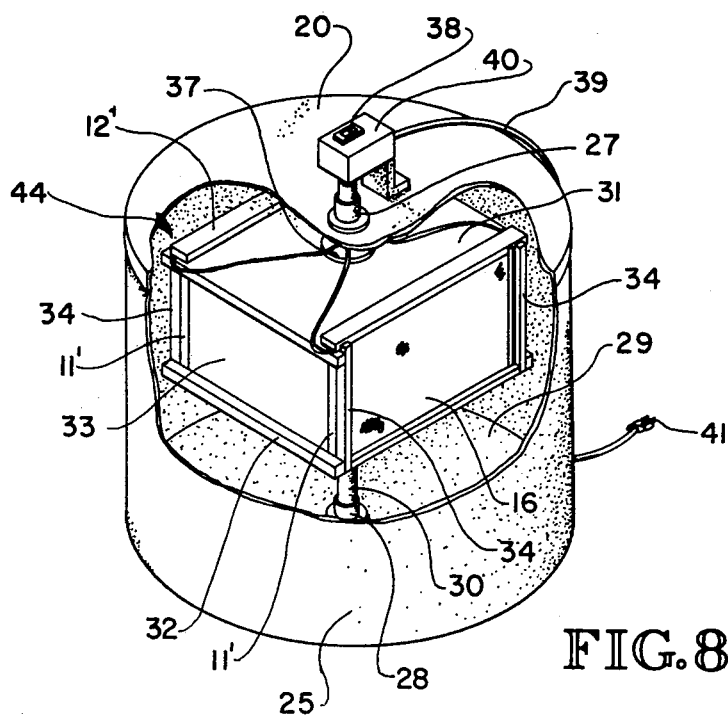
FIG. 8 is a partially cutaway perspective view of the centrifugal force extracting device with the electrical uncapping frames therein.

From the above it can be seen that in the modified extractor the honey is removed from both sides of the honeycomb at once thus eliminating the need for reversal of the comb as is required in the extractor of FIG. 8. This, of course, is a distinct advantage in saving time and labor and is particularly advantageous when the number of combs that can be placed in the modified extractor are considered.

Once the honey has been extracted from the honeycomb in the modified extractor, lid 46 is removed as is locking ring 66 and the honeycomb frames 10 lifted therefrom. These empty frames with their associated honeycombs can then be cleaned up and replaced in the hive for refilling by the bees.

When the open mesh honeycomb foundation 15 is formed from an electrically conductive material such as wire or expanding metal, such foundation can include end connectors and contact plates similar to those described for the artificial honeycomb. In such cases, the honey removal can be accomplished either through the use of an extractor or similar separation method for removal of the honey from the honeycomb.

From the above, it can be seen that a greatly improved artificial honeycomb is provided which includes means for self-uncapping. This self-uncapping feature readily lends itself to honey removal by centrifugal force and two relatively simple and yet highly efficient devices for accomplishing this have been disclosed.

The terms "top", "bottom", "end", "sides", and so forth have been used herein merely for convenience to describe the present invention and its parts as oriented in the drawings. It is to be understood, however, that these terms are in no way limiting to the invention since such invention may obviously be disposed in many different orientations when in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A beekeeping means comprising: a honeycomb frame; an artificial honeycomb having a plurality of open ended cells therein mounted within said frame; heating means disposed adjacent the open ends of said cells; and means for causing said heating means to rise in temperature whereby when said honeycomb and its associated frame are placed in a bee hive, said cells will be filled with honey and sealed with beeswax by the bees therein and when said comb and frame are removed from the hive, said sealing wax can be readily removed from said cells by said heating means.

2. The means of claim 1 wherein the honeycomb is made from a plastic type material.

3. The means of claim 1 wherein the heating means is a grid of resistance type heating elements embedded within said comb adjacent the open ends of said cells.

4. The means of claim 3 wherein the means for causing said heating means to rise in temperature is an electrical current applied to said heating elements.

5. The means of claim 4 wherein an extractor device is provided for removing the honey from the honeycomb after said beeswax has been removed by said heating means.

6. The means of claim 5 wherein the extractor is of the centrifugal force type.

7. The means of claim 1 wherein an extractor device is provided for removing the honey from the honeycomb after said beeswax has been removed by said heating means.

8. The means of claim 7 wherein the extractor is of the centrifugal force type.

9. The means of claim 8 wherein said centrifugal extractor is motor driven.

10. The means of claim 8 wherein said centrifugal extractor is hand driven.

* * * * *